United States Patent [19]
Bailey

[11] Patent Number: 6,042,131
[45] Date of Patent: Mar. 28, 2000

[54] VEHICLE REAR SUSPENSION SYSTEM

[76] Inventor: Joseph Allen Bailey, 10502-2 Alvin Rd., Jacksonville, Fla. 32222

[21] Appl. No.: 08/984,982

[22] Filed: Dec. 4, 1997

[51] Int. Cl.⁷ ..................................................... B60G 9/02
[52] U.S. Cl. ............................... 280/86.75; 280/124.116; 280/124.156; 180/352
[58] Field of Search ...................... 280/86.757, 86.751, 280/86.75, 124.116, 124.156; 180/349, 352, 348, 378

[56] References Cited

U.S. PATENT DOCUMENTS

| | | | |
|---|---|---|---|
| 2,300,844 | 11/1942 | Olley | 280/124.116 |
| 3,406,983 | 10/1968 | Masser | 280/124.156 |
| 4,033,609 | 7/1977 | Malcolm | 280/86.75 |
| 4,087,116 | 5/1978 | Morimoto | 280/124.156 |
| 5,458,359 | 10/1995 | Brandt | 280/124.116 |
| 5,524,921 | 6/1996 | Ellingsen | 280/86.75 |
| 5,803,200 | 9/1998 | Brandt | 180/348 |

*Primary Examiner*—Peter C. English

[57] ABSTRACT

A vehicle rear suspension system comprises a cross member having pivot mounts extending rearwardly and inwardly therefrom and mounting plates connected to respective vehicle frame members. A left cross member portion is aligned with a right cross member portion, and a middle cross member portion is located above the left and right portions. Left and right upper control arms have front ends pivotally connected to adjustable front box receivers and rear ends pivotally connected to a differential housing. Each front box receiver is fixed to a respective one of the pivot mounts and has a plurality of adjustment openings for adjusting mounting points of the front ends of the upper control arms. Left and right lower control arms have front ends pivotally connected to front box receivers and rear ends pivotally connected to respective axle tubes extending from the differential housing. The front box receivers for the lower control arms are fixed to respective ones of the frame members on an inboard side thereof such that the front ends of the lower control arms are closer to a vehicle centerline than the rear ends of the lower control arms.

2 Claims, 2 Drawing Sheets

VEHICLE REAR SUSPENSION SYSTEM

BACKGROUND OF THE INVENTION

1. Field of the Invention

The present invention relates to a vehicle rear end suspension system. More particularly, the present invention relates to a vehicle rear end suspension system having improved geometry to effectively apply traction to rear wheels under acceleration.

2. Description of the Prior Art

Vehicle suspension systems are well known in the art. Due to the different configurations of vehicles and varying centers of gravity, there exists a need for a universal adjustable rear end suspension system which can be utilized by most all makes and models of vehicles.

Comparison of the present invention to "Morrison/Gazan" system

POINT 1

The "Morrison/Gazan" system uses Round Tubing in both upper and lower control arms. The present invention uses Square Tubing. Square Tubing is much more resistant to lateral forces than round tubing would be.

POINT 2

The "Morrison/Gazan" system uses "Rod Ends" or "Hiem Joints" to locate rear mounting point of upper control arms. The present invention system uses a ³⁄₁₆×2½" thick boxed end and a +e,fra /2+ee shank grade 8 bolt to locate rear mounting point of upper control arms. By N.H.R.A. rules the rod ends or heim joints used by "Morrison/Gazan" system must be replaced every year at a higher cost per piece. Method used in the present invention requires no replacement once installed.

POINT 3

The "Morrison/Gazan" system requires the installation of a roll-bar or cage in order to install an x-brace to keep side frame rails from being pushed out of square. The present invention requires no additional components to maintain frame rail alignment. The design and placement of the cross member used to mount front ends of upper control arms in the present invention eliminates this problem.

POINT 4

Because the Morrison/Gazan system is a bolt in system, it must rely on the strength of factory mounting points or methods used for locating front points of both upper and lower control arms. These mounting points or methods have proven through the years to be inadequate for serious high performance use. By design the present invention system eliminates these weak spots by use of its bulletproof designed upper and lower boxed receivers which are welded into place.

POINT 5

If the owner of a valuable muscle car wanted to race his or her car without adding a cage or roll-bar it could be done with the present invention system installed. A roll cage or bar would detract from the "money value" of the car. The Morrison/Gazan system requires a roll cage or roll bar installed to allow for the x-brace needed to maintain squareness of side frame rails. Lack of the appearance of such roll cages and roll bars is also a desired effect in sleeper type cars (sleeper: a car that appears to have no performance improvements). Further, the Morrison/Gazan system is designed specifically for one model and platform of vehicle. The present invention is adaptable to a variety of models and platforms.

POINT 6

The present invention also allows upon installation the ability to set pinion angle at static ride height so that under "Torque Situations" the proper pinion angle is achieved. The fact that the present invention system incorporates "replacement" lower-front box receivers that require desired positioning and welding upon installation allows this feature.

Numerous innovations for a vehicle rear end suspension system have been provided in the prior art that are described as follows. Even though these innovations may be suitable for the specific individual purposes to which they address, they differ from the present invention as hereinafter contrasted.

In U.S. Pat. No. 5,522,469, titled Vehicle Traction Enhancement Device, invented by Haruyuki Hosoya, a vehicle traction enhancement device is formed of a suspension attached to a frame of a vehicle, a drive axle mounted on the frame through the suspension, a driven axle mounted on a frame, a bracket mounted on the drive axle substantially parallel to the frame, and an air spring mounted between the bracket and the frame. The air spring receives compressed air therein for expansion thereof when the vehicle starts to move to thereby increase pressure of drive axle tires attached to the drive axle relative to a ground.

The patented invention differs from the present invention because the patented invention is designed to function with a second rear axle on a vehicle equipped with two rear axles, only one of which is driven. A device pushes the drive axle downward as the vehicle starts moving increasing the downward pressure on the road. The features of the patented invention are not similar to the present invention.

In U.S. Pat. No. 5,228,719, titled Automotive Active Suspension System for Anti-Rolling Control, invented by Kensuke Fukuyama, Naoto Fukushima, Yosuke Akatsu, Itaru Fujimura and Masaharu Sato, an automotive suspension control system for anti-rolling motion control is provided. This system serves to adjust wheel loads acting on driven wheels when a wheel speed difference between the driven wheels is greater than a preselected value, concluding that slippage occurs at one of the driven wheels, the adjustment is carried out for securing traction of a slipping driven wheel. The system is responsive to lateral acceleration acting on a vehicle body to decrease a degree of adjustment of the wheel loads according to increase in the lateral acceleration for enhancing cornering stability on road surfaces having different friction coefficients.

The patented invention differs from the present invention because the patented invention is a device which adjusts wheel loads acting on driven wheels when a wheel speed difference between the driven wheels is greater than a preselected value. The patented invention lacks features similar to the present invention.

In U.S. Pat. No. 4,993,729, titled Vehicle Suspension, invented by John S. Payne, an over the highway truck or tractor suspension with traction enhancement. Air springs are provided for the rear axles of a 2×6 vehicle. Normally the load is evenly divided between driven and tag axles. When enhanced traction is desired, the tag axle springs are communicated with an auxiliary tank to reduce pressure in them while air under pressure is supplied to the driven axle springs to increase the pressure in them and thereby increase the portion of the load on the driven axle to provide enhanced traction.

The patented invention differs from the present invention because the patented invention is a device which adjusts wheel loads acting on driven wheels when a wheel speed difference between the driven wheels is greater than a preselected value. The patented invention lacks features similar to the present invention.

In U.S. Pat. No. 4,840,394, titled Articulated Suspension System, invented by Donald B. Bickler, a vehicle is provided which maintains a substantially constant weight, and therefore traction, on all wheels, despite one wheel moving considerably higher or lower than the others, while avoiding a very soft spring suspension. The vehicle includes a chassis or body to be supported and a pair of side suspensions at either side of the body. In a six-wheel vehicle, each side suspension includes a middle wheel, and front and rear linkages respectively coupling the front and rear wheels to the middle wheel. A body link pivotally connects the front and rear linkages together, with the middle of the body link rising or failing by only a fraction of the rise or fall of any of the three wheels. The body link pivotally supports the middle of the length of the body. A transverse suspension for suspending the end of the body on the side suspensions includes a middle part pivotally connected to the body about a longitudinal axis and opposite ends each pivotally connected to one of the side suspensions along at least a longitudinal axis.

The patented invention differs from the present invention because the patented invention is a device which adjusts wheel loads acting on the ground to evenly distribute the weight of the vehicle across all of the wheels. The patented invention lacks features providing increased traction to the ground from the drive train.

In U.S. Pat. No. 4,415,140, titled Net Hauling Sheave Device with Tailing Pressure Wheel, invented by Kenneth J. Deering, the presser wheel support comprises a depending support arm pivotally connected to the end of a cantilevered arm projecting at a downward slope in the tailing direction from a net hauler sheave frame member preferably in the form of a transverse suspension plate overlying the net hauler sheave. A fluid operated jack interacting between the hauler sheave frame and the support arm generally in the common plane of the hauler sheave and presser wheel urges the wheel yieldably against netting descending in the main hauler sheave groove so as to increase the hauling traction and hauling force exerted on the netting to avoid slippage and damage of netting.

The patented invention lacks features similar to the present invention.

In U.S. Pat. No. 4,159,126, titled Model Racing Car having an Improved Rear Wheel Suspension, invented by Roger W. Raleigh, a rear wheel suspension system for a model racing car, the motor, rear axle and rear wheels are all supported from a supporting platform which is spring mounted to the chassis via the intermediary of a pair of springs, preferably coil springs, disposed in laterally spaced positions on opposite sides of the longitudinal center line of the chassis. A third point of attachment between the supporting platform and the chassis is provided at a point longitudinally spaced from the pair of mounting springs. The suspension system is so arranged as to permit a relative twisting action between the mounting platform and the main portion of the chassis so as to permit twisting or rotation of the supporting platform about both the longitudinal axis of the chassis and an axis transverse to the chassis, whereby independent suspension of the wheels is obtained relative to the chassis for improved stability and traction.

The patented invention differs from the present invention because the patented invention is a rear wheel suspension system for a model racing car. Although the patent invention has to do with a rear suspension system, the patented invention lacks features similar to the present invention.

In U.S. Pat. No. 4,007,949, titled Vehicle Wheel Loading Bar and Mounting Arrangement, invented by John A. Norcia and Raymond E. Bickar, a loading bar is mounted on a leaf spring of a racing vehicle rear axle suspension system to increase traction on the vehicle tires during acceleration. Strut tube and strap members are mounted in a spaced relationship on the vehicle leaf spring rearwardly and adjacent to the vehicle axle by a pair of U-bolts and reinforcing plates. The tube and strap members extend rearwardly from the axle and are joined at their extended ends by a wheel bracket and a strut tube adjusting channel. The strut tube extends in an upwardly angled direction between the adjusting channel and axle, with the strap member being generally parallel with respect to the ground or racetrack. A wheel or roller is mounted on the wheel bracket and is spaced above the ground when in static condition. The loading bar is readily adjustable on the leaf spring to change the traction aiding effect thereof Upon rapid acceleration of the vehicle, the torque loading and rotation of the differential housing deflects the leaf spring in an area adjacent the spaced mounting of the loading bar which pivots the loading bar wheel into contact with the ground. The leverage gained from the loading bar forces the rear driving wheels of the vehicle down onto the pavement with more force than that gained from the weight transferred along. momentarily increasing the traction on the tires.

The patented invention differs from the present invention because the patented invention is a loading bar is mounted on a leaf spring of a racing vehicle rear axle suspension system to increase traction on the vehicle tires during acceleration. The patented invention prevents the front of the vehicle from rising during acceleration. The patented invention attaches only to the rear spring.

Numerous innovations for a vehicle rear end suspension system have been provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to a vehicle rear end suspension system. More particularly, the present invention relates to a vehicle rear end suspension system having improved geometry to effectively apply traction to rear wheels under acceleration. The main purpose of the present invention is to achieve maximum traction under acceleration with a narrower tire/wheel combo than would normally be possible. The present system was designed to drastically improve rear wheel traction by way of superior suspension geometry, and, at the same time eliminate weak spots in factory built three and four link rear suspension systems. The present invention was designed to be used with General Motors 10 or 12 bolt rear-ends set up for four link systems. These rear-ends normally have many more gear sets available than do other rear-end types.

Since the present invention was designed to be an integral part of the car and not just an add-on item, it was built to be used in high horsepower applications without failure. The present invention places the lower control arms parallel to the ground. The front mounting point is mounted by boxed receivers with integral frame mounts, and rear mounting points locate to factory mounts on axle housing ends. The upper control arms rear mounting points are located on top of rear-end housing in stock location. By using a new cross member to relocate front mounting points approximately six inches lower than stock, this creates the improved geometry that applies the tremendous down-force evenly on rear tires.

The installation of the system also addresses the problem of the rear axle being cocked diagonally in-between the side frame rails. For the first time ever, in a kit form, the installer is able to correct wheel base geometry that was built incorrectly at the factory. The present invention was built to take serious abuse while maintaining precision operation at all times, and at the same time will provide an acceptable ride quality for every day use on the street.

The types of problems encountered in the prior art are rear end suspension systems that are not adaptable to different vehicles.

In the prior art, unsucessful attempts to solve this problem were attempted namely: making different models of vehicle suspension systems. However, the problem was solved by the present invention because it is adjustable to conform to different vehicles.

Innovations within the prior art are rapidly being exploited in the field of automotive accessories.

The present invention went contrary to the teaching of the art which teaches various configurations of suspension systems differing from the present invention.

The present invention solved a long felt need for an adjustable suspension system.

The present invention produced unexpected results namely: traction was increased on slippery road conditions resulting in less accidents to the user.

A synergistic effect was produced utilizing the present invention due to the following facts and results from experimentation: by increasing traction and reducing fatalities and accidents, it may be possible to re-classify a vehicle using the present invention into a lower cost insurance premium class.

Accordingly, it is an object of the present invention to provide a vehicle rear suspension system.

More particularly, it is an object of the present invention to provide a vehicle rear suspension system having a cross member, two upper arms, and two lower control arms having front boxed receivers with integral frame mounts.

In keeping with these objects, and with others which will become apparent hereinafter, one feature of the present invention resides, briefly stated, in the cross member having a left cross member portion, a right cross member portion and a middle cross member portion.

When the left cross member portion is designed in accordance with the present invention, it has a left cross member pivot mount and a left cross member to frame mounting plate.

In accordance with another feature of the present invention, the right cross member portion has a right cross member pivot mount and a right cross member to frame mounting plate.

Yet another feature of the present invention is that the left upper control arm has a left upper control arm front box receiver with multiple mounting points in its opening, and a left upper control arm rear boxed end.

Still another feature of the present invention is that the right upper control arm has a right upper control arm front box receiver with multiple mounting points in its opening, and a right upper control arm rear boxed end.

Still yet another feature of the present invention is that the left lower control arm has a left lower control arm front boxed end.

Another feature of the present invention is that the right lower control arm has a right lower control arm front boxed end.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

LIST OF REFERENCE NUMERALS UTILIZED IN THE DRAWINGS

10—vehicle rear suspension system (10)
12—cross member (12)
12L—left cross member portion (12L)
12LA—left cross member pivot mount (12LA)
12LB—left cross member to frame mounting plate (12LB)
12R—right cross member portion (12R)
12RA—right cross member pivot mount (12RA)
12RB—right cross member to frame mounting plate (12RB)
12M—middle cross member portion (12M)
14LU—left upper control arm (14LU)
14LA—left upper control arm adjustable front box receiver (14LA)
14LB—left upper control arm rear boxed end (14LB)
14RU—right upper control arm (14RU)
14RA—right upper control arm adjustable front box receiver (14RA)
14RAA—mounting openings of box receiver (14RAA) (not shown)
14RB—right upper control arm rear boxed end (14RB)
16LL—left lower control arm (16LL)
16LA—left lower control arm front box receiver (16LA)
16RL—right lower control arm (16RL)
16RA—right lower control arm front box receiver (16RA)
18—fastener (18)
20L—vehicle left frame (20L)
20R—vehicle right frame (20R)
22—vehicle rear end housing (22)
24—drive shaft (24)

DESCRIPTION OF THE PREFERRED EMBODIMENT

Figure 1:
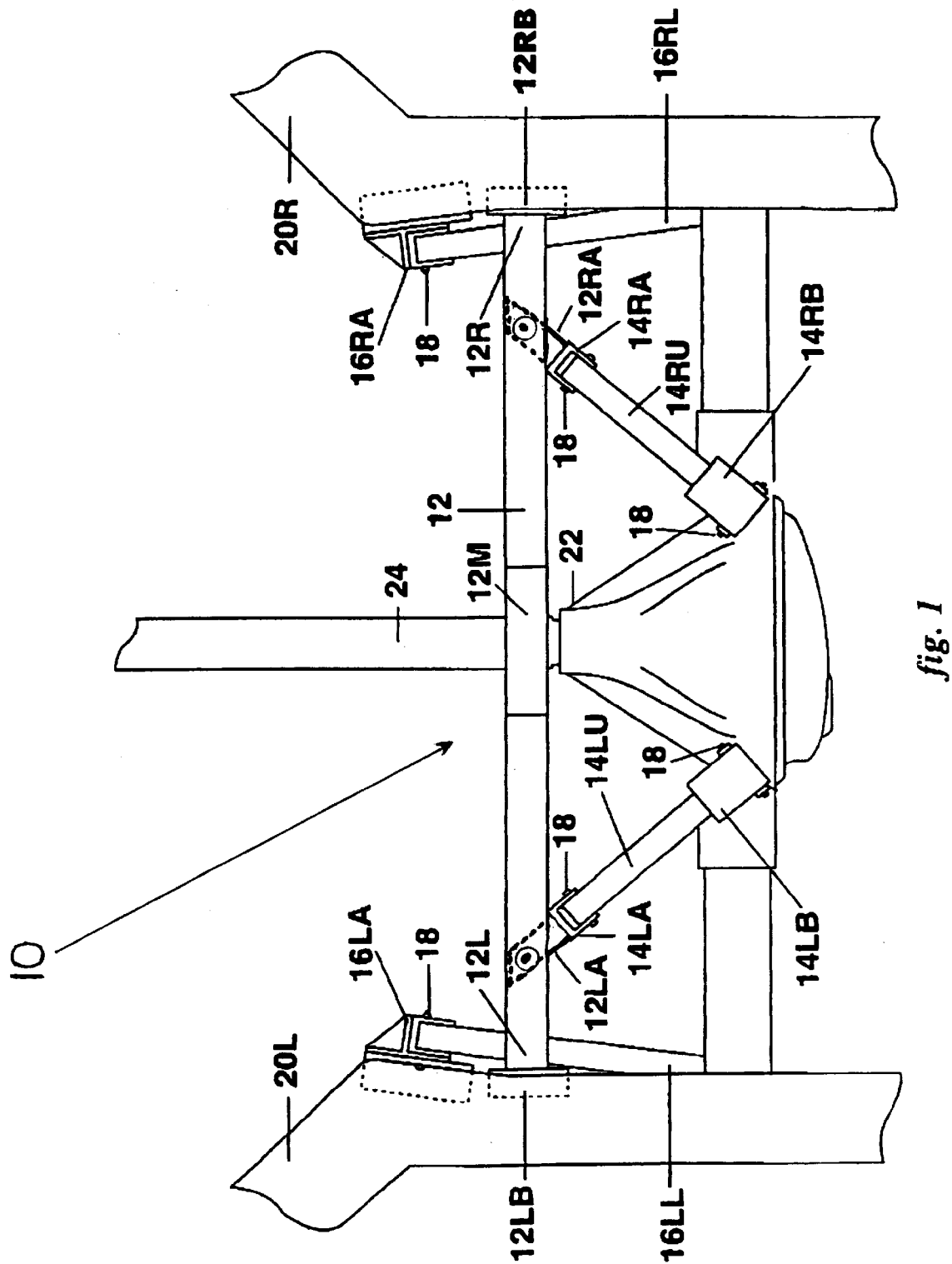
FIG. 1 is a top view of a vehicle rear suspension system.

Firstly, referring to FIG. 1, a vehicle rear suspension system (10) comprises a cross member (12) which comprises a left cross member portion (12L) having a left cross member pivot mount (12LA) extending therefrom and a right cross member portion (12R) having a right cross member pivot mount (12RA) extending therefrom and a middle cross member portion (12M). The left cross member portion (12L) is mountable onto a vehicle left frame (20L) by a left cross member to frame mounting plate (12LB). The right cross member portion (12R) is mountable onto a vehicle right frame (20R) by a right cross member to frame mounting plate (12RB). The middle cross member portion (12M) is positioned higher than an alignment between the left cross member portion (12L) and the right cross member portion (12R) functioning to provide space for a drive shaft (24) to rotate thereunder.

The vehicle rear suspension system (10) further comprises a left upper control arm (14LU) connected at a front distal end to a left upper control arm adjustable front box receiver (14LA) and connected at a rear distal end to a left upper control arm rear boxed end (14LB) mounted on a vehicle rear end or differential housing (22). The mounting means are preferably removably insertable fasteners (18). The right upper control arm (14RU) is connected at a front distal end to a right upper control arm adjustable front box receiver (14RA) and connected at a rear distal end to a right upper control arm rear boxed end (14RB) mounted on the vehicle rear end housing (22). Rear mounting points of the upper control arms (14LU, 14RU) and the lower control arms (16LL, 16RL) are mounted in stock locations such as ears on top of a General Motors (TM) 10 or 12 bolt housing and brackets on the axle tube ends (stock location). The left upper control arm adjustable front box receiver (14LA) is securely affixed to the left cross member pivot mount (12LA). The left upper control arm rear boxed end (14LB) is securely affixed to the vehicle rear end housing (22).

The vehicle rear suspension system (10) further comprises a left lower control arm (16LL) connected at a front distal end to a left lower control arm front box receiver (16LA) securely mounted on the vehicle left frame (20L). The right lower control arm (16RL) is connected at a front distal end to a right lower control arm front 16 box receiver (16RA) securely mounted on the vehicle right frame (20R). The vehicle rear suspension system (10) is manufactured from a material selected from a group consisting of metal, metal alloy, plastic, plastic composite and carbon-graphite. The preferable material is metal or metal alloy.

Figure 2:
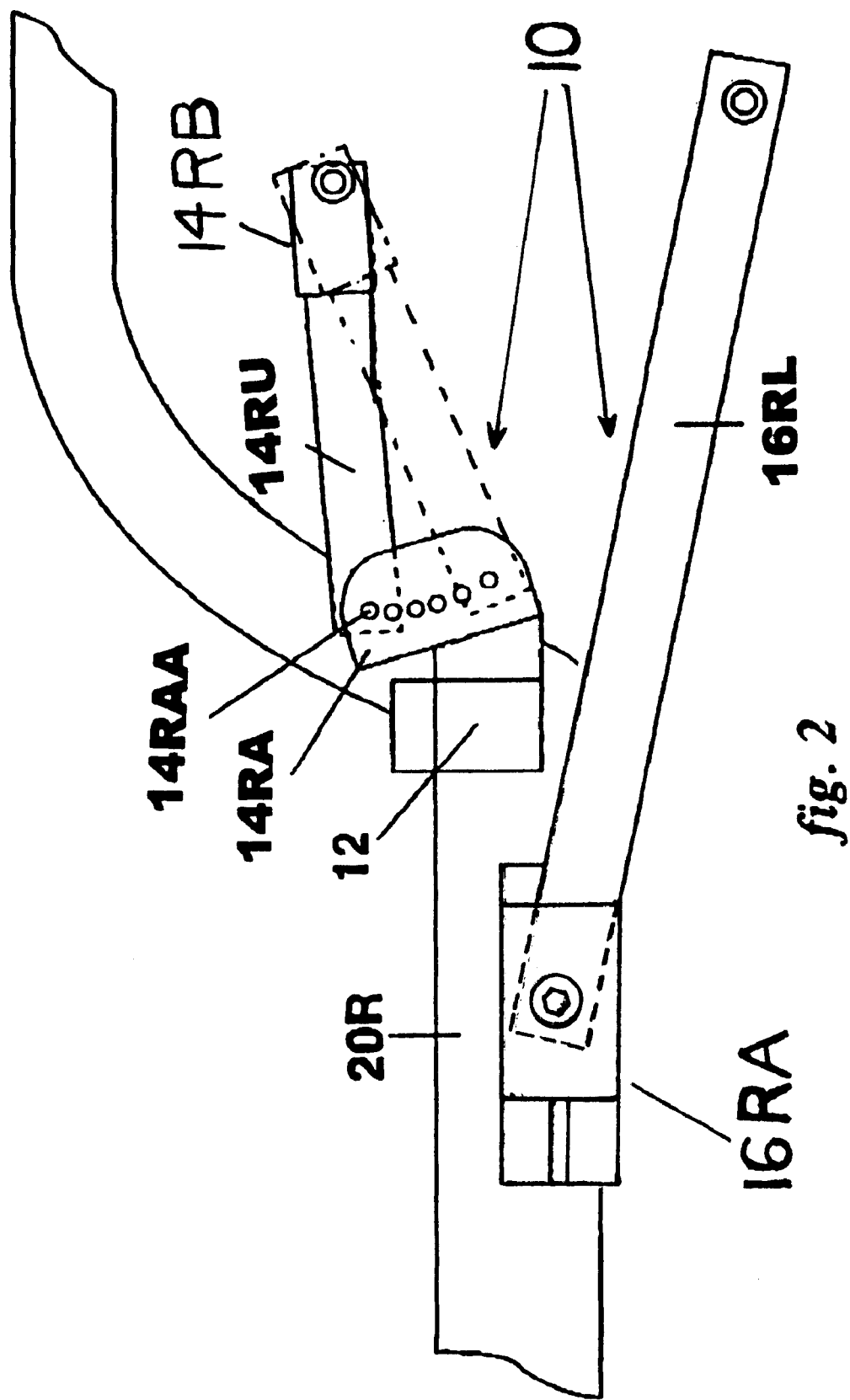
FIG. 2 is a left side view of a vehicle rear suspension system mounted on a vehicle right frame rail.

Referring to FIG. 2 which is a left side view of a vehicle rear suspension system (10) mounted on a vehicle right frame (20R). The right upper control arm (14RU) is mounted at a front distal end to the right upper control arm adjustable front box receiver (14RA). The right upper control arm (14RU) and right lower control arm (16RL) are manufactured from box tubing.

The right upper control arm adjustable front box receiver (14RA) comprises a plurality of upper/lower mounting points for box receiver openings (14RAA) for securely fastening the right upper control arm (14RU). The lower mounting point box receiver opening moves an instant center toward the rear of a car (increases traction). The upper mounting point box receiver opening moves the instant center toward the front of the car (decreases traction). Under acceleration, force is applied through the right upper control arm (14RU) to create a downward force on rear tires. Modifications required are as follows: Control arm bushings on General Motors 10 or 12 bolt rear-end must have "fat" part on each end of bushing trimmed back even with outer metal shell of bushing. Inner metal sleeve also needs to be trimmed even with outer metal shell of bushing. The only other modification required to install the vehicle rear suspension system (10) is to remove the two brackets used by the factory to mount the front mounting point of lower control arms. Simply grind away the two bottom welds (approximately 1" long) on each side on bottom of side frame rails where lower control arms are mounted on front points of lower control arms and remove factory mounts (on three and four link factory models).

The control arms in the vehicle rear suspension system (10) kit are designed to use any one of three types of bushings, as follows:

1. Solid machined steel bushings . . . steel bushings provide quicker response from suspension system and transfers the most captured force to the rear tires. Steel bushings have grease fittings installed.
2. Polyurathane bushings . . . poly-bushings give a little smoother ride than steel, but are still very firm; traction is almost the same as with steel bushings.
3. O.E.M. rubber bushings . . . these provide best ride quality every day on the street but still deliver outstanding traction.

The total vehicle rear suspension system (10) system consists of:

1. One 3/16" wall thickness×2½"×2½" box tube cross member with pivoting front-upper adjustable boxed receivers mounted. The cross member is cut oversized to fit most frame widths.
2. Two front-lower boxed receivers with integral frame mounts, 3/16" wall thickness×2½"×2½" box tube—frame mounts (integral) 3/16"×3"×2½" angle iron.
3. Two lower control arms: 2" box tube, 3/16" wall thickness 22" center to center of bushings.
4. Two upper control arms: 2" box tube, 3/16" wall thickness 11" center to center of bushings and 2½"×3/16" wall thickness boxed ends, mounted on rear-end of upper control arms, made to mount on bushings on top of 10 or 12 bolt G.M. rear-end housing.
5. Two cross member to frame mounting plates, 1/8" diamond plate steel. (Fabricated boxed plates).
6. Eight gold-irradiated grade 8 bolts, ½"×4", with nylon lock-nuts.

The vehicle rear suspension system (10) may also be installed in any vehicles with full side frame rails, including pick-ups and vans. This is designed as a weld-in kit with very little frame modification requirements.

It will be understood that each of the elements described above, or two or more together, may also find a useful application in other types of constructions differing from the type described above.

While the invention has been illustrated and described as embodied in a vehicle suspension system, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. A vehicle rear suspension system (10) comprising:
    a cross member (12) having a left portion (12L), a right portion (12R) and a middle portion (12M), each of the left and right portions having a pivot mount (12LA, 12RA) extending rearwardly and inwardly therefrom and a mounting plate (12LB, 12RB) connected to a respective vehicle frame member (20L, 20R), the left portion being aligned with the right portion, and the middle portion being located above the left and right portions;
    left and right upper control arms (14LU, 14RU) each having a front end pivotally connected to an adjustable front box receiver (14LA, 14RA) and a rear end pivotally connected to a differential housing (22) at a respective differential housing mounting point such that the rear ends of the upper control arms are closer to a vehicle centerline than the front ends of the lower control arms, each front box receiver being fixed to a respective one of the pivot mounts (12LA, 12RA) and having a plurality of adjustment openings for adjusting mounting points of the front ends of the upper control arms; and left and right lower control arms (16LL, 16RL) each having a front end pivotally connected to a front box receiver (16LA, 16RA) and a rear end pivotally connected to a respective axle tube extending from the differential housing (22), the front box receivers for the lower control arms being fixed to a respective one of the frame members (20L, 20R) on an inboard side of the respective frame member such that the front ends of the lower control arms are closer to the vehicle centerline than the rear ends of the lower control arms.

2. A vehicle rear suspension system as set forth in claim 1 wherein the cross member, lower control arms and upper control arms are formed of square tubing.

* * * * *